(12) United States Patent
Chen

(10) Patent No.: US 7,114,022 B2
(45) Date of Patent: Sep. 26, 2006

(54) METHOD FOR GENERATING INTERRUPT SIGNAL AND MEDIA ACCESS CONTROLLER UTILIZING THE SAME

(75) Inventor: Yi-Jeng Chen, Taipei (TW)

(73) Assignee: Via Technologies, Inc., (TW)

( * ) Notice: Subject to any disclaimer, the term of this patent is extended or adjusted under 35 U.S.C. 154(b) by 226 days.

(21) Appl. No.: 10/264,658

(22) Filed: Oct. 4, 2002

(65) Prior Publication Data
US 2003/0212808 A1    Nov. 13, 2003

(30) Foreign Application Priority Data
Apr. 24, 2002    (TW) ............................... 91108798 A

(51) Int. Cl.
*G06F 13/24* (2006.01)

(52) U.S. Cl. ....................... 710/260; 710/262; 710/266

(58) Field of Classification Search ................ 710/260, 710/262, 266, 22, 28; 709/200
See application file for complete search history.

(56) References Cited

U.S. PATENT DOCUMENTS

| | | | | |
|---|---|---|---|---|
| 4,764,893 A | * | 8/1988 | Karabatsos | ................. 710/262 |
| 5,708,814 A | * | 1/1998 | Short et al. | ................. 710/260 |
| 5,740,467 A | * | 4/1998 | Chmielecki et al. | .......... 710/56 |
| 6,115,776 A | * | 9/2000 | Reid et al. | ................... 710/260 |
| 6,192,440 B1 | * | 2/2001 | Lowe et al. | ................. 710/260 |

OTHER PUBLICATIONS

Andrew Tanenbaum, "Structured Computer Organization", 1990, Prentice-Hall, Inc., 3rd Ed., pp. 11-13.*

* cited by examiner

Primary Examiner—Mark H. Rinehart
Assistant Examiner—Justin I. King

(57) ABSTRACT

A method for generating an interrupt signal for a media access controller (MAC) in communication with a computer host and an external network is disclosed. The method includes steps of asserting an interrupt signal to the computer host when at least one data packet is to be transferred from a memory, performing a corresponding interrupt service of the computer host in response to the interrupt signal for freeing a memory space occupied by the data packet being transferred from the memory, and deasserting the interrupt signal until the corresponding interrupt service is finished and a predetermined delay period is up. In addition, a media access controller (MAC) is also disclosed. The MAC includes a timer for counting a predetermined delay period after the interrupt service has been finished.

11 Claims, 5 Drawing Sheets

METHOD FOR GENERATING INTERRUPT SIGNAL AND MEDIA ACCESS CONTROLLER UTILIZING THE SAME

FIELD OF THE INVENTION

The present invention relates to a method for generating an interrupt signal, and more particularly to a method for generating an interrupt signal for use in a media access controller (MAC). The present invention also relates to a media access controller that generates an interrupt signal for efficient data transfer.

BACKGROUND OF THE INVENTION

Please refer to FIG. 1 which is a schematic block diagram illustrating a typical internal structure of a personal computer in communication with an external network. The personal computer includes a microprocessor 10, a north bridge chip 11, a south bridge chip 12, a memory 111 and a network interface card 121. The memory 111 is connected to the north bridge chip 11. The network interface card 121 is connected to the north bridge chip 11 via a peripheral component interconnect (PCI) bus. The network interface card 121 includes a media access controller (MAC) 1211 and a physical layer device (PHY) 1212. In some configurations, the MAC 1211 could be directly integrated into the south bridge chip 12. The PHY 1212 is used for connecting to an external network.

When transceiving data packets, the MAC 1211 issues interrupt signals to the microprocessor 10 for interrupting hardware. The microprocessor 10 suspends the proceeding job to perform an interrupt service routine (ISR) for the driver of the MAC 1211. FIG. 2A is a schematic waveform diagram illustrating concerned signals of the MAC 1211 and its driver when receiving data packets. When the data receiving signal RxDV is at a high level, it represents that the MAC is receiving data packets. When the data receiving signal RxDV switches from the high level to a low level, it represents that one data packet is completely received. Meanwhile, the interrupt signal INTA is outputted as a low-level pulse signal and the register value of the perfect Rx interrupt mask (PRXM) is switched from logic "1" into logic "0". The microprocessor 10 proceeds the ISR and the defer procedure code (DPC) operations in response to the interrupt signal INTA to allow the operating system (OS) to process the data packet, which is received by the MAC 1211 and stored in the memory 111, and release the occupied memory space. After finishing the DPC operation, a section of program codes EnableINT is executed to recover the mask for the register value of the PRXM from logic "0" back to logic "1". Thus, another interrupt signal can be generated upon completing receiving the data packet.

FIG. 2B is a schematic waveform diagram illustrating concerned signals of the MAC 1211 and its driver when transmitting out data packets. When the data transmitting signal TxDV is at a high level, it represents that the MAC is transmitting out data packets. When the data transmitting signal TxDV switches from the high level to a low level, it represents that the transmission of one data packet is finished. Meanwhile, the interrupt signal INTA is outputted as a low-level pulse signal, and the register value of the perfect Tx interrupt mask (PTXM) is switched from logic "1" into logic "0". The microprocessor 10 proceeds the ISR and the defer procedure code (DPC) operations to allow the operating system (OS) to free the memory space occupied by the transmitted data packet. After finishing the DPC operation, likewise, a section of program codes EnableINT is executed to recover the mask for the register value of the PTXM form logic "0" back to logic "1". Thus, another interrupt signal can be generated when finishing a new the data packet transmission.

As shown in FIGS. 2A and 2B, the MAC 1211 asserts the interrupt signal, i.e. INTA of the low-level pulse signal, whenever one data packet is received or transmitted. It results in that the operation resource of the microprocessor 10 is frequently occupied. In addition, particularly for the wideband network, the data flow between the system and the MAC is huge. Hence, the microprocessor is frequently interrupted, so the operation resource of the microprocessor 10 will be frequently occupied to deteriorate the performance of the system. Moreover, in some operating systems, a hang-up situation is likely to occur due to frequent hardware interruption.

Therefore, the purpose of the present invention is to timely generate an interrupt signal so as to deal with the above situations encountered in the prior art.

SUMMARY OF THE INVENTION

An object of the present invention is to provide a method and a media access controller for coordinating the interrupt signal generation in order to avoid unduly frequent hardware interruption.

According to an aspect of the present invention, there is provided a method for generating an interrupt signal for a media access controller (MAC) in communication with a computer host and an external network. The method includes steps of asserting an interrupt signal to the computer host when at least one data packet is to be transferred from a memory, performing a corresponding interrupt service of the computer host in response to the interrupt signal for releasing a memory space occupied by the data packet being transferred from the memory, and deasserting said interrupt signal until the corresponding interrupt service is finished and a predetermined delay period is up.

Preferably, a plurality of data packets are to be transferred, and the predetermined delay period extends over more than one data packet.

For example, the interrupt service includes an interrupt service routine (ISR) and a defer procedure code (DPC).

In an embodiment, the predetermined delay period is counted by a hardware timer. Preferably, another interrupt signal is asserted to the computer host upon the corresponding interrupt service has been finished and the predetermined delay period has been counted up by the hardware timer.

In another embodiment, the predetermined delay period is counted by a software timer. Preferably, the method further includes a step of enabling an interrupt mask to trigger the computer host to perform the interrupt service when the predetermined delay period has been counted up by the software timer. For example, the interrupt mask can be a perfect Rx interrupt mask (PRXM) or a perfect Tx interrupt mask (PTXM).

Preferably, the method further includes steps of periodically detecting a generating frequency of the interrupt signal, and disabling said deasserting step when the generating frequency is smaller than a threshold value.

Preferably, the method further includes steps of periodically detecting a data throughput variance, and disabling said deasserting step when the data throughput variance indicates a decreasing data flow.

According to another aspect of the present invention, there is provided a media access controller (MAC) in communication with a computer host and an external network. The computer host performs a corresponding interrupt service in response to the assertion of the interrupt signal for freeing a memory space occupied by data packets having been transferred. The media access controller includes a timer for counting a predetermined delay period after the interrupt service has been finished, wherein the interrupt signal is deasserted to the computer host until the predetermined delay period is counted up by the timer.

Preferably, the timer is a one-shot timer, which asserts the interrupt signal to the computer host for performing the corresponding interrupt service when counting the predetermined delay period up.

Preferably, the computer host includes a bridging chip and the media access controller is electrically connected to the bridging chip. For example, the bridging chip can be a north bridge chip.

For example, the media access controller can be integrated in a network chip or south bridge chip.

BRIEF DESCRIPTION OF THE DRAWINGS

The present invention may best be understood through the following description with reference to the accompanying drawings, in which.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 1:
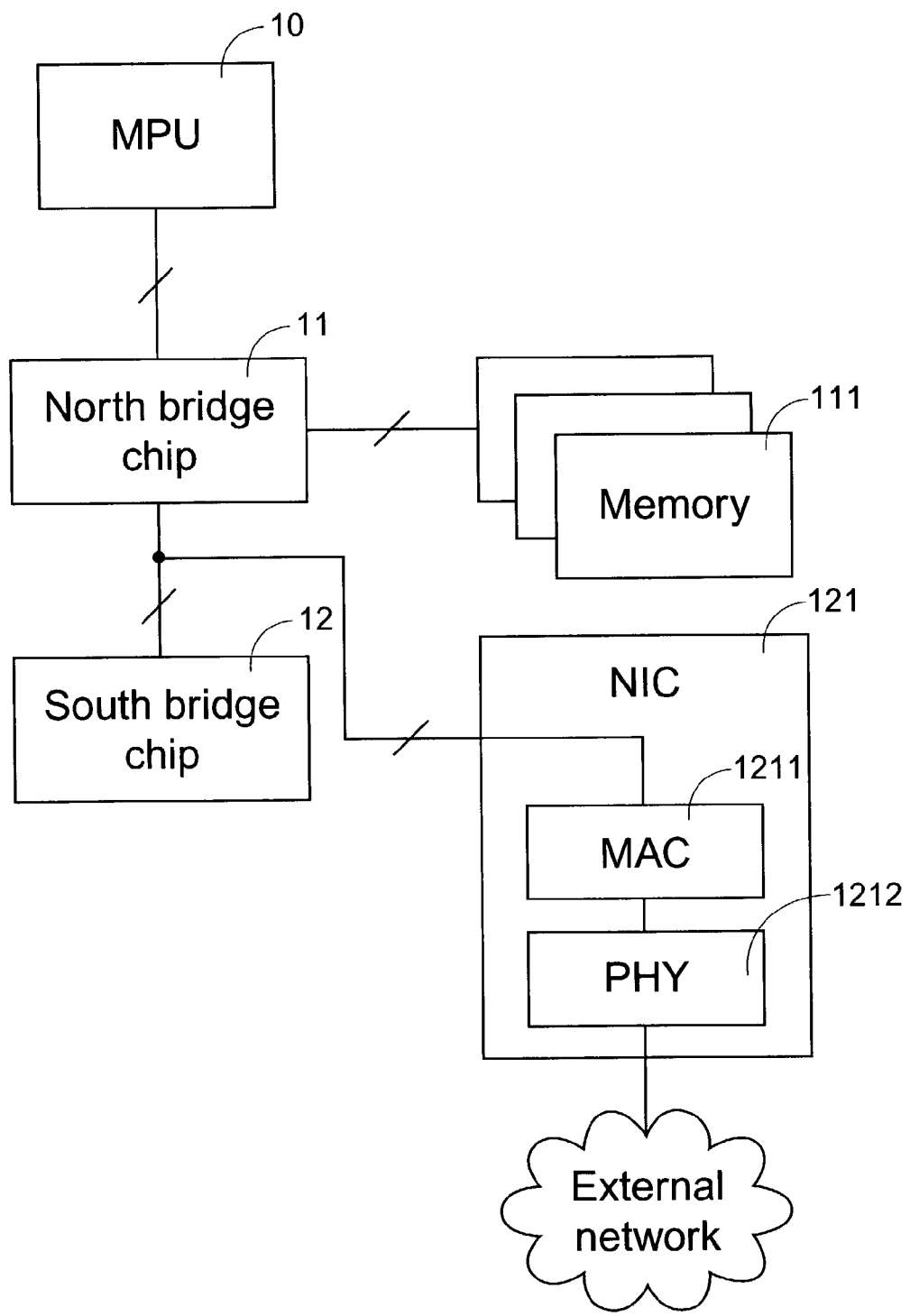
FIG. 1 is a schematic block diagram illustrating a typical internal structure of a personal computer in communication with an external network.
Figure 2A:
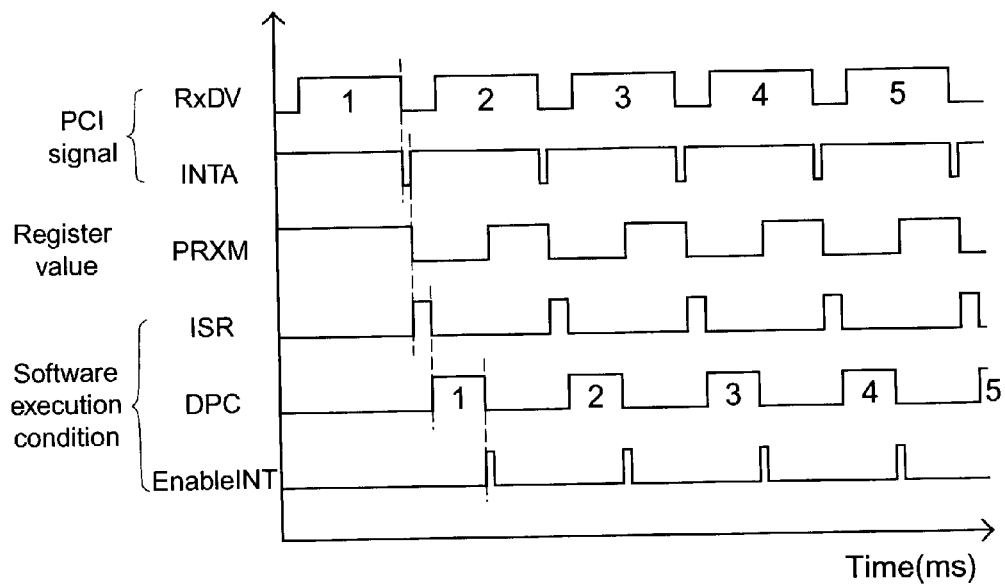
FIG. 2A is a schematic waveform diagram illustrating concerned signals of the MAC and its driver when receiving data packets according to the prior art.
Figure 2B:
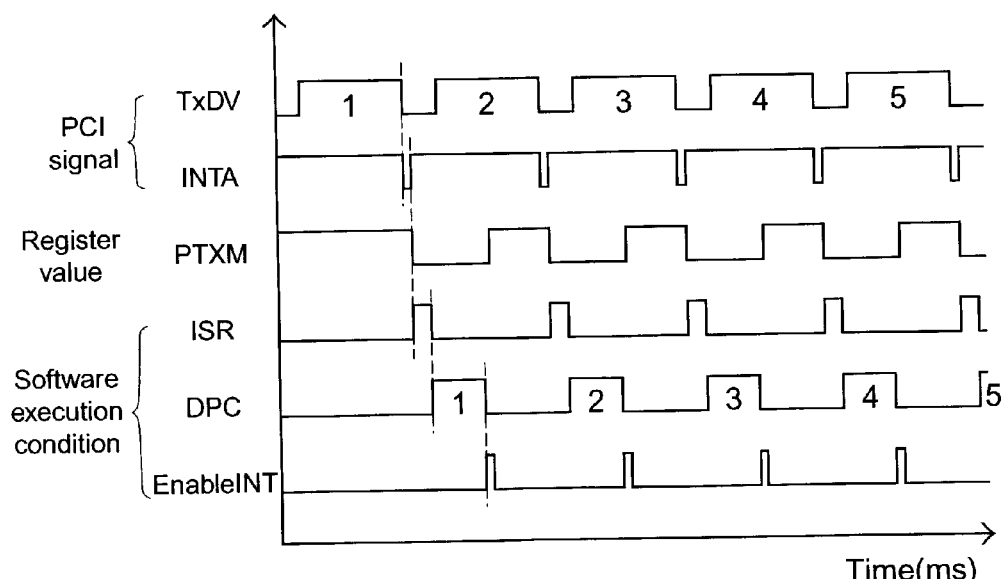
FIG. 2B is a schematic waveform diagram illustrating concerned signals of the MAC and its driver when transmitting out data packets according to prior art.
Figure 3A:
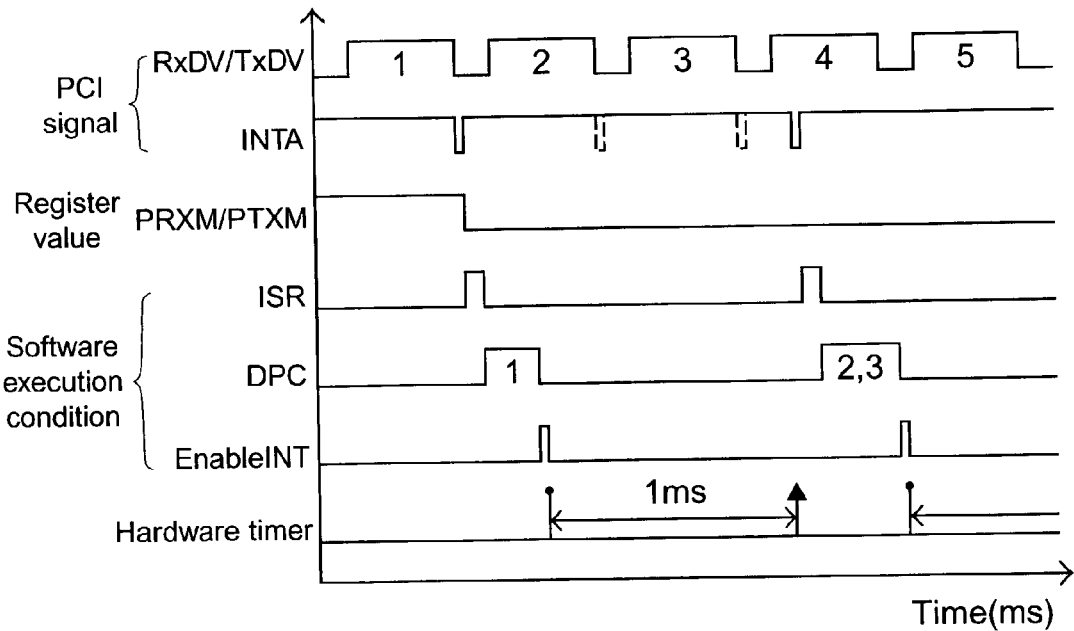
FIG. 3A is a schematic waveform diagram illustrating concerned signals of a media access controller (MAC) and its driver when receiving/transmitting out data packets according to a preferred embodiment of the present invention.

Please refer to FIG. 3A which is a schematic waveform diagram illustrating concerned signals of a media access controller (MAC) and its driver when receiving data packets according to a preferred embodiment of the present invention. The data receiving signal RxDV at a high level represents that the MAC is receiving a data packet. When the data receiving signal RxDV switches from the high level to a low level, it represents that the first data packet is completely received. Meanwhile, an interrupt status register is changed to logic "1", an interrupt signal INTA is outputted as a low-level pulse signal, and a register value of a perfect Rx interrupt mask (PRXM) is switched from logic "1" into logic "0". The microprocessor 10 proceeds an interrupt service routine (ISR) and a defer procedure code (DPC) operations in response to the interrupt signal INTA to allow the operating system (OS) to process the data packet, which is received by the MAC 1211 and stored in the memory 111, and free the occupied memory space. After finishing the DPC operation, a section of program codes EnableINT is executed. Meanwhile, a hardware timer, e.g. a one-shot timer, starts to count in response to the program code EnableINT. When the accumulative time value of the hardware timer reaches a predetermined value, the hardware timer asserts again the interrupt signal INTA for triggering the microprocessor 10 to proceed the corresponding ISR and DPC operations to allow the operating system to process the received data packets. Analogically, when the flow of the data packets is heavy, a plurality of data packets received within a predetermined delay period can be processed together at one interruption. For example, as shown in FIG. 3A, the second and third data packets are received within the 1 ms delay period, and can be transferred from/to the memory together. In such way, the problem of high frequent hardware interruption, resulting in that the operation resource of the microprocessor is largely occupied, can be alleviated.

Figure 3B:
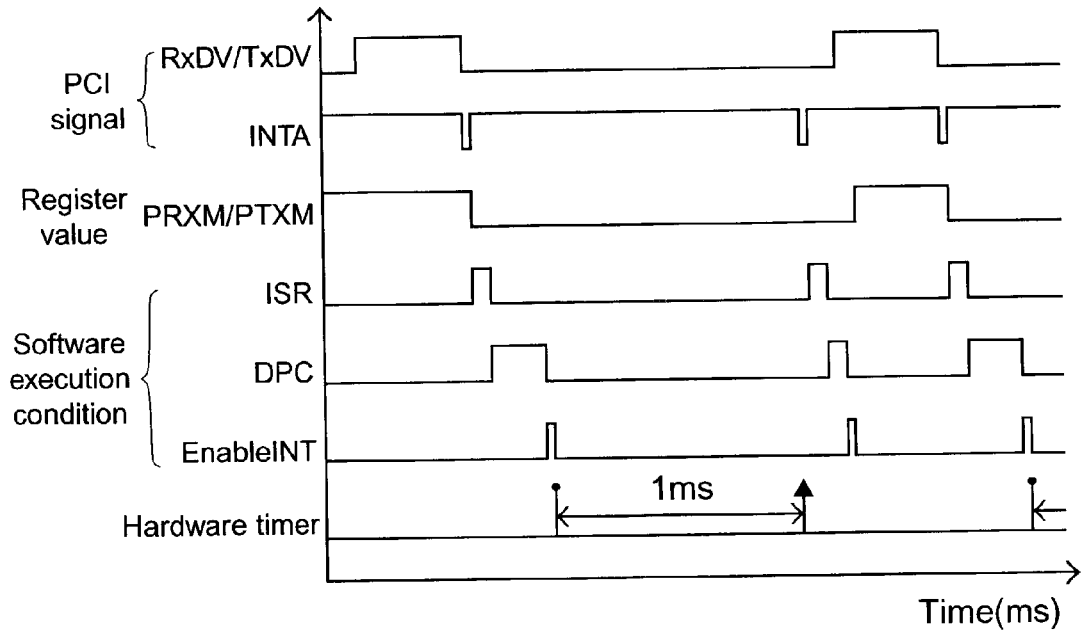
FIG. 3B is a schematic waveform diagram illustrating concerned signals of a media access controller (MAC) and its driver when receiving/transmitting out data packets according to another preferred embodiment of the present invention.

FIG. 3B is a schematic waveform diagram illustrating concerned signals of a media access controller and its driver when tranceiving out data packets according to another preferred embodiment of the present invention. When the flow of data packets is low, and more specifically, the MAC does not receive any data packet within a predetermined period, the system samples the asserting frequency of the interrupt signal at intervals. Once the sampled frequency is smaller than a threshold value, the mechanism for delaying asserting the interrupt signal as mentioned above is preferably disabled. For example, when the predetermined period is 1 ms, the frequency of the interrupt signals is sampled per 200 ms and the number of executing the ISR is counted. When the sampled frequency is smaller than 1000 Hz, the mechanism for delaying the interrupt signal by the timer is disabled.

In addition, the data throughput variance can also be referred to in order to determine whether to actuate the mechanism for delaying the interrupt signal by the timer. For example, again, the predetermined period is set to be 1 ms and the throughput variance is sampled per 200 ms. By calculating the sampled throughput variance, the operational mechanism of the present invention is determined according to the following Table 1.

TABLE 1

| Current throughput variance | Operation status if preceding status is "ON" | Operation status if preceding status is "OFF" |
|---|---|---|
| ≧0 | Keep "ON" | Turn "ON" |
| <0 | Turn "OFF" | Turn "ON" |

The operation principle for transmitting out data packets is similar to that for receiving data packets except that the data receiving signal RxDV and the perfect Rx interrupt mask (PRXM) are replaced by the data transmitting signal TxDV and the perfect Tx interrupt mask (PTXM), respectively. Therefore, it is unnecessary to be redundantly described herein.

Figure 4:
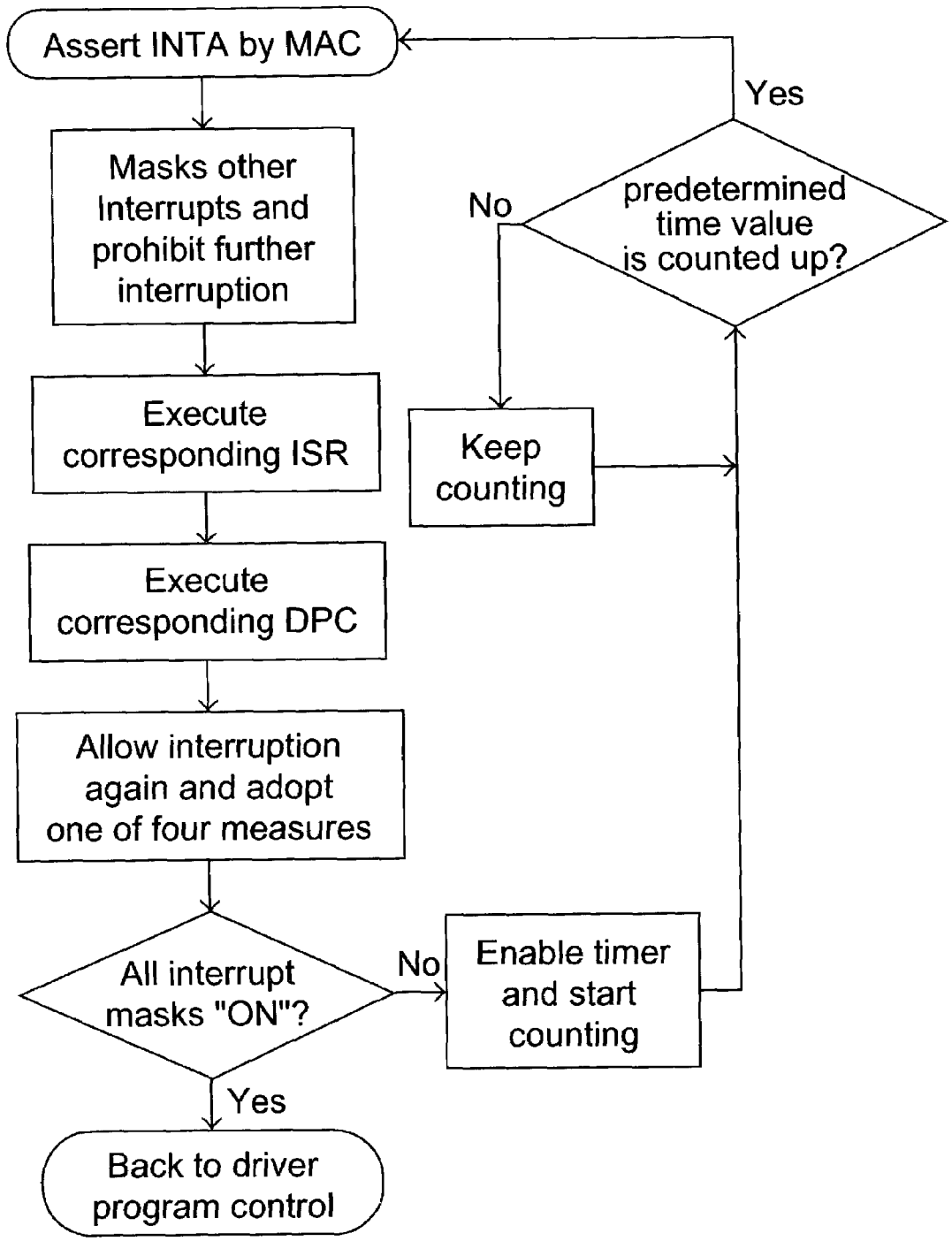
FIG. 4 is a flowchart illustrating a method for coordinating the generation of an interrupt signal for use in a media access controller according to a preferred embodiment of the present invention.

FIG. 4 is a flowchart illustrating a method for coordinating the generation of an interrupt signal for use in a media access controller according to a preferred embodiment of the present invention. When the MAC asserts the interrupt signal, the operating system masks other interrupts such as PRXM and PTXM to prohibit further interruption, and subsequently executes the corresponding ISR and DPC. After the execution is finished, subsequent interruption is allowed. Four possible situations are described hereinafter. If the interrupt signal is a transmitting interrupt (Tx interrupt), all of interrupt masks except PTXM are turned "ON". If the interrupt signal is a receiving interrupt (Rx interrupt), all of interrupt masks except PRXM are turned "ON". If the interrupt signal includes both the transmitting and receiving interrupts at the same time, all of interrupt masks except PTXM and PRXM are turned "ON". Otherwise, all of interrupt masks are turned "ON". Since the former three kinds of interruption relate to the receiving and transmitting of the data packets, the timer is started to proceed the mechanism for delaying the interrupt signal generation under these circumstances.

Figure 5:
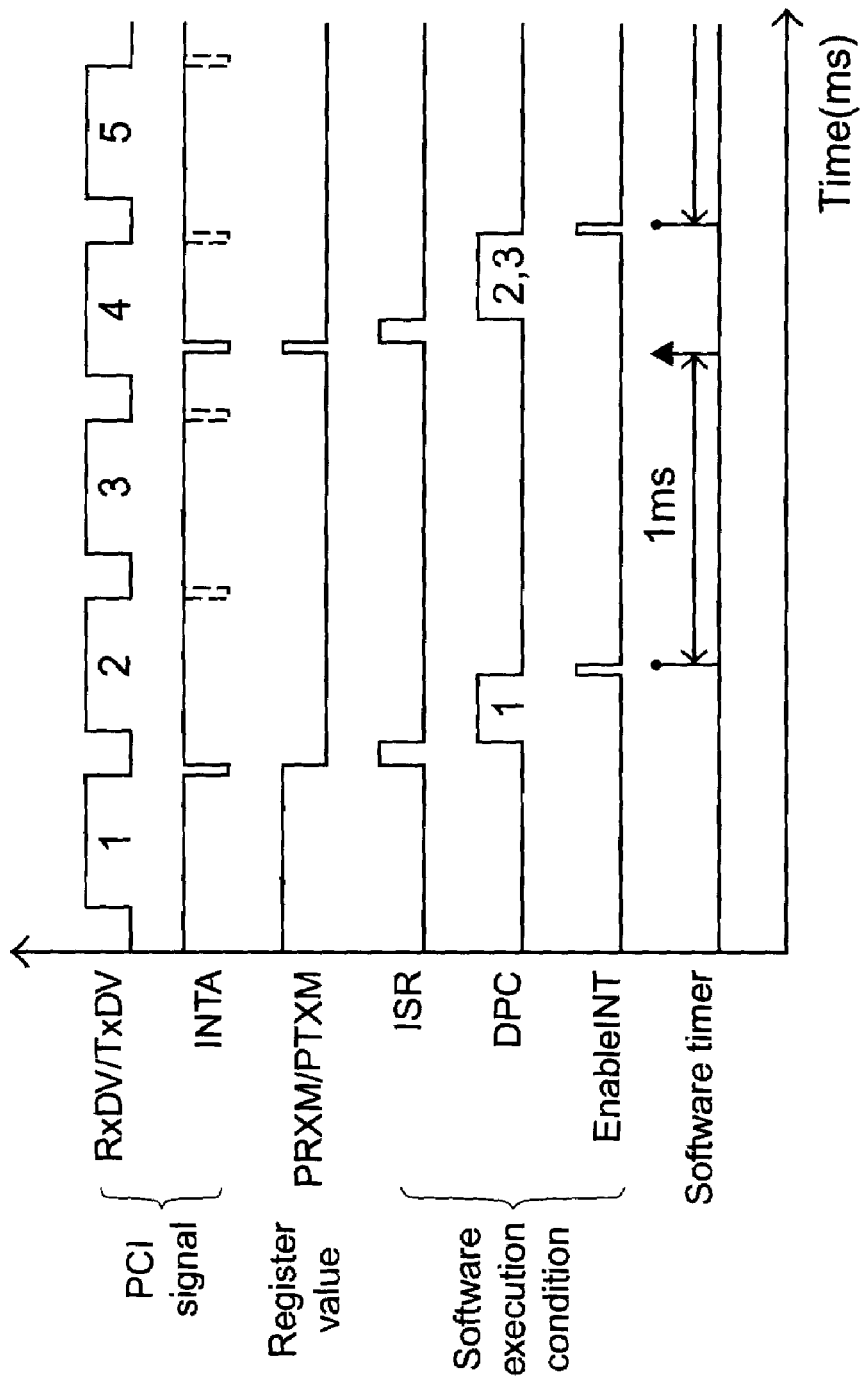
FIG. 5 is a schematic waveform diagram illustrating concerned signals of MAC according to another preferred embodiment of the present invention.

Please refer to FIG. 5 which is a schematic waveform diagram illustrating associated signals of MAC according to another preferred embodiment of the present invention. In this embodiment, the hardware timer is replaced by a software timer. The software timer commands the value of PRXM or PTXM from 0 to 1 instead of asserting the interrupt signal INTA physically. When the interrupt status register is logic "1" and the PRXM or PTXM is also logic "1", the MAC asserts the interrupt signal INTA to force the PRXM or PTXM to logic "0" again. Meanwhile, the microprocessor proceeds the corresponding ISR and DPC operations in response to the interrupt signal INTA for allowing the operating system to process the second and third data packets stored in the memory together and free the occupied memory resource.

To sum up, for either a hardware or a software timer, the mechanism for delaying the interrupt signal generation can be implemented to practice the present invention. In addition, the MAC can be installed on a network interface card (NIC), a network chip or a south bridge chip.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for generating an interrupt signal for a media access controller (MAC) in communication with a computer host and an external network, comprising steps of:

asserting a first interrupt signal to said computer host under a first logic state of an interrupt mask when a first group of data packets is to be transferred from a memory;

performing a first interrupt service of said computer host in response to said first interrupt signal for freeing a space of said memory occupied by said first group of data packets having been transferred from said memory;

switching said interrupt mask from said first logic state to a second logic state in response to the assertion of said first interrupt signal for temporarily prohibiting further transmitting interrupt but permitting receiving interrupt when said first interrupt signal is essentially a transmitting interrupt;

switching said interrupt mask from said first logic state to said second logic state in response to the assertion of said first interrupt signal for temporarily prohibiting further receiving interrupt but permitting transmitting interrupt when said first interrupt signal is essentially a receiving interrupt;

switching said interrupt mask from said first logic state to said second logic state in response to the assertion of said first interrupt signal for temporarily prohibiting further receiving interrupt and transmitting interrupt when said first interrupt signal includes both receiving interrupt and transmitting interrupt;

asserting a second interrupt signal under said second logic state of said interrupt mask after said first interrupt service has been finished for a predetermined delay period; and performing a second interrupt service of said computer host in response to said second interrupt signal.

2. The method according to claim 1 wherein each of said first and second interrupt service includes an interrupt service routine (ISR) and a defer procedure code (DPC).

3. The method according to claim 1 wherein said predetermined delay period is counted by a hardware timer.

4. The method according to claim 3 wherein said second interrupt signal is a timer interrupt.

5. The method according to claim 1 wherein said predetermined delay period is counted by a software timer.

6. The method according to claim 1 further comprising steps of:

detecting an asserting frequency of interrupt signals; and disabling said step of asserting said second interrupt signal under said second logic state of said interrupt mask when said generating frequency is smaller than a threshold value.

7. The method according to claim 1 further comprising steps of:

periodically detecting a data throughput variance; and disabling said step of asserting said second interrupt signal under said second logic state of said interrupt mask when said data throughput variance indicates a decreasing data flow.

8. The method according to claim 1 further comprising a step of asserting a third interrupt signal under said second logic state of said interrupt mask after said second interrupt service has been finished for said predetermined delay period if there has been a second group of data packets processed with said second interrupt service.

9. The method according to claim 8 wherein said third interrupt signal is a timer interrupt.

10. The method according to claim 1 further comprising a step of switching said interrupt mask from said second logic state to said first logic state to permit a fourth interrupt signal if there is no data packet processed with said second interrupt service.

11. The method according to claim 1 wherein said first logic state is logic high and said second logic state is logic low.

* * * * *